United States Patent
Modarressi et al.

(10) Patent No.: US 7,554,968 B1
(45) Date of Patent: Jun. 30, 2009

(54) AIN SERVICE DELIVERY AND PROGRAMMABILITY OVER THE INTERNET

(75) Inventors: Abdi R. Modarressi, Lawrenceville, GA (US); John R. Betten, Acworth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 871 days.

(21) Appl. No.: 09/746,650

(22) Filed: Dec. 26, 2000

(51) Int. Cl.
*H04L 12/66* (2006.01)
*H04L 12/56* (2006.01)

(52) U.S. Cl. ............... 370/352; 370/401; 379/88.17

(58) Field of Classification Search ......... 370/352–356, 370/400, 401; 379/201, 215.01, 99.35, 211.02, 379/88.17, 229, 230
See application file for complete search history.

(56) References Cited

U.S. PATENT DOCUMENTS

| | | | |
|---|---|---|---|
| 5,600,710 A | 2/1997 | Weisser et al. | |
| 5,701,301 A | 12/1997 | Weisser, Jr. | |
| 5,805,587 A * | 9/1998 | Norris et al. | 370/352 |
| 5,809,128 A * | 9/1998 | McMullin | 379/215.01 |
| 5,838,774 A | 11/1998 | Weisser, Jr. | |
| 5,848,142 A | 12/1998 | Yaker | |
| 5,889,774 A | 3/1999 | Mirashrafi et al. | |
| 5,917,817 A * | 6/1999 | Dunn et al. | 370/352 |
| 5,946,381 A * | 8/1999 | Danne et al. | 379/142.07 |
| 5,958,016 A | 9/1999 | Chang et al. | |
| 5,974,133 A * | 10/1999 | Fleischer et al. | 379/230 |
| 6,005,870 A * | 12/1999 | Leung et al. | 370/466 |
| 6,014,379 A * | 1/2000 | White et al. | 370/389 |
| 6,078,581 A | 6/2000 | Shtivelman et al. | |
| 6,144,644 A * | 11/2000 | Bajzath et al. | 370/259 |
| 6,144,667 A | 11/2000 | Doshi et al. | |
| 6,178,183 B1 * | 1/2001 | Buskirk, Jr. | 370/493 |
| 6,212,261 B1 * | 4/2001 | Meubus et al. | 379/88.12 |
| 6,246,758 B1 * | 6/2001 | Low et al. | 379/230 |
| 6,253,249 B1 | 6/2001 | Belzile | |
| 6,353,611 B1 * | 3/2002 | Norris et al. | 370/356 |
| 6,366,661 B1 * | 4/2002 | Devillier et al. | 379/211.01 |
| 6,377,568 B1 | 4/2002 | Kelly | |

(Continued)

OTHER PUBLICATIONS

Hansson et al. Phone Doubler - A step towards integrated Internet and telphone communities, 1997, Ericsson Review, No. 4, pp. 142-151.

(Continued)

*Primary Examiner*—Hong Cho
*Assistant Examiner*—Robert C Scheibel
(74) *Attorney, Agent, or Firm*—Withers & Keys, LLC (57) ABSTRACT

The present invention integrates Advanced Intelligent Network (AIN) and computer network technologies to provide telephone services. The system of the present invention comprises a gateway serving as an interface between a service control point (SCP) of an AIN and a computer network. The computer network is preferably the Internet. The SCP obtains call routing instructions from the subscriber of the present invention through a link during a communication session between the subscriber and the computer network. A trigger is provisioned on a subscriber's line. When a call for a telephone line having the provisioned trigger is detected at a service switching point (SSP), a query is launched to the SCP. A call processing request query comprising calling party information is provided to the gateway. The gateway obtains a response from the computer network containing call processing instructions. The call is processed in accordance with the response.

43 Claims, 9 Drawing Sheets

U.S. PATENT DOCUMENTS

| | | | |
|---|---|---|---|
| 6,393,467 B1 | 5/2002 | Potvin | |
| 6,438,222 B1 * | 8/2002 | Burg | 379/215.01 |
| 6,661,785 B1 * | 12/2003 | Zhang et al. | 370/352 |
| 6,693,897 B1 * | 2/2004 | Huang | 370/352 |
| 6,711,401 B1 * | 3/2004 | Chow et al. | 455/414.1 |
| 6,757,274 B1 * | 6/2004 | Bedingfield et al. | 370/352 |
| 6,891,940 B1 * | 5/2005 | Bhandari et al. | 379/142.06 |
| 7,342,919 B2 | 3/2008 | Zhang et al. | |
| 2002/0097710 A1 * | 7/2002 | Burg | 370/352 |
| 2002/0167940 A1 * | 11/2002 | Low et al. | 370/352 |
| 2002/0168055 A1 * | 11/2002 | Crockett et al. | 379/88.01 |
| 2003/0108172 A1 * | 6/2003 | Petty et al. | 379/142.08 |
| 2004/0090954 A1 | 5/2004 | Zhang | |

OTHER PUBLICATIONS

Bellcore Document No. GR-1298-CORE, "AINGER: Switching Systems" Section 2 and Section 3, Issue 4, (Sep. 1997).

Bellcore Document No. GR-1299-CORE, Switch Service Control Point (SGP)/Adjunct Interface, Issue 4, (Sep. 1997).

* cited by examiner

AIN SERVICE DELIVERY AND PROGRAMMABILITY OVER THE INTERNET

BACKGROUND

1. Field of the Invention

The present invention relates to telecommunications and the Internet, and in particular, to a system and method for delivering advanced intelligent network (AIN) services over the Internet.

2. Background of the Invention

The Internet is being used by an increasing number of people everyday. It has become the communication medium of choice for many people. As more people get "online," new information, products, and services are being made available over the Internet. Currently, the most common method for accessing the Internet is through a dial-up connection using plain old telephone service (POTS) lines. For additional costs, people may access the Internet using dedicated communication links. For example, DSL, T-1, T-3, and other dedicated communications links are available for high speed Internet access.

Currently, when a subscriber uses a POTS line to access the Internet, the subscriber cannot use the telephone line for receiving calls. As a result, significant communications between calling parties and the subscriber could not be established as long as the subscriber remains online. The problem could be aggravated when the subscriber stays online for hours at a time. Thus, there is a need for a system and method that enables the subscriber to have an opportunity to decide whether he should terminate his Internet session to free up the telephone line to accept an incoming call.

Dedicated communication links have become more common and more affordable. Many people and corporations have 24/7 Internet access using, for example, a DSL. The omnipresent communication session between a telephone service subscriber and the Internet through the dedicated communication link provides unprecedented opportunities for telephone service providers to deliver enhanced telephone services to the subscriber at lower cost via the Internet. However, effective systems and methods for delivering AIN services over the Internet have not been developed until now.

The concept of a subscriber being able to "program" the network so that the delivery of his or her network-based services is customized and tailored to meet his or her specific needs is a powerful concept. However, this concept has in the past been difficult to realize primarily due to the fact that the customer's real-time access to service provisioning is exceedingly hard and expensive to manage in today's secured telecommunication network environment. Although certain AIN services, e.g., Flexible Call Forwarding (FCF), have given the customer, to a limited extent, control over managing call forwarding services, these services have, by and large, left a gap in the marketplace of intelligent network services. Third party service providers have attempted to partially address this gap by providing services and capabilities on the edges of the network without any interactions with AIN capabilities within the network. WILDFIRE (from Wildfire Communications, Inc.) and similar electronic personal assistant services are examples of such third party service providers. With the rise of the Internet as the ubiquitous data network with universal access, new capabilities can be envisioned for interaction of AIN services with Customer Premises Equipment (CPE)-based functionality to enhance customization and customer control.

Accordingly, there is a need for a system and method for managing AIN services over the Internet.

SUMMARY OF THE INVENTION

The present invention integrates AIN and Internet technologies to provide telephone services. Subscribers of AIN services have increased flexibility in management of telephone calls through a computer network. The system of the present invention comprises an interface or a gateway between a service control point (SCP) and a computer network. The computer network is preferably the Internet. The gateway preferably has the capability to interface directly with a service switching point (SSP). The interface between the gateway and the SSP may be via voice and signaling channels. When a caller calls a subscriber's telephone number, a trigger on the subscriber's telephone line is encountered, causing the SSP to issue a query to the SCP. In response to the query, the SCP can establish a communication session (via the gateway) with a computer operated by the subscriber on the computer network. The SCP can then query the subscriber directly for routing instructions (e.g., provide busy signal, ring with no answer, ring and allow subscriber to answer, or forward to designated forwarding number). The SCP can then answer the SSP's query with the appropriate instructions. If the subscriber does not respond to the query, the SCP can supply a default response determined by looking at its internal subscriber databases. In an alternative embodiment, the SCP may query the subscriber's computer which is programmed by the subscriber to provide a response to such queries.

The gateway used in the present invention can serve a number of purposes including: (1) protecting a telephone service provider's network from unauthorized direct access by external computers, and (2) providing a voice circuit for temporarily holding incoming calls while the subscriber prepares to receive the calls. Such temporary holding is necessary, for example, if the subscriber has only one telephone line, and the subscriber wishes to receive the call after gracefully terminating the network session. In this situation, the SCP can instruct the SSP to "park" the call on the gateway (i.e., forward the call to the gateway until the subscriber's telephone line becomes available). Accordingly, in a preferred embodiment, the gateway is capable of using multiple communications protocols to establish communications sessions between the gateway and an SSP, the gateway and an SCP, and the gateway and the subscriber's computer network.

The present invention may be implemented in a variety of different embodiments to provide flexible services for a full range of subscribers' requirements. A first preferred embodiment of the invention can provide services for subscribers who use their telephone line to establish a network connection with the computer network, e.g., subscriber dialing their Internet service provider (ISP) to gain access to the Internet. In this embodiment, when the caller establishes the network connection, a database on an SCP is updated indicating the subscriber is online. Further, in this embodiment, a suitable trigger can be provisioned on the subscriber's telephone line at the subscriber's SSP. Whenever the SSP receives an incoming call to the subscriber's telephone line it issues a query to an SCP requesting routing instructions. The SCP recognizes that the subscriber (or at a minimum, the subscriber's line) is engaged in a network session and attempts to contact the subscriber over the computer network (via the gateway system). Accordingly, the SCP can send information about the inbound call and query the subscriber for call handling instructions using call processing requests. When the subscriber answers the query, the gateway forwards the response back to the SCP. The SCP can then provide an appropriate response to the SSP.

As noted above, in this embodiment, if the subscriber indicates a desire to take the call, the call can be parked on the gateway by the SSP. Once the subscriber terminates his or her network session, the gateway signals the SSP to forward the call to the subscriber's line. As this call will be treated as a new inbound call, the trigger on the subscriber's telephone line will be encountered once again causing the SSP to issue another query to the SCP. However, because the gateway was the redirecting party, the SCP will instruct the SSP to connect the call to the subscriber.

Other possible responses by the subscriber can include instructions to (1) provide the caller with a busy signal, (2) provide the caller with a ringing signal, (3) forward the call to another line, voicemail box and the like, or (4) provide no response. As noted above, if no response is received, the SCP may query the subscriber's computer directly, or may look to its own databases to provide call processing instructions.

Another preferred embodiment of the present invention can be directed to service a subscriber having a dedicated communication link for connecting the subscriber and the computer network. As will be apparent in the following description, this embodiment allows a subscriber to easily configure and manage a call routing scheme for multiple telephone lines without the need for sophisticated automatic call distribution (ACD) computers, and without the need to coordinate each and every configuration change with the subscriber's telephone service provider. In this embodiment, the communications link is preferably available and connected to the computer network on a full-time basis, e.g., twenty-four hours a day, seven days a week. Such communications links are commonly employed by business concerns and/or households having multiple computer and telephone users.

The subscriber can identify (to the telephone service provider) which telephone line or telephone lines will be processed by the system and method of the present invention. Each of these telephone lines can be provisioned with a suitable trigger as described above. The trigger is encountered when a call to any one of the subscriber's designated telephone lines is received. In response to the trigger, the SSP queries the SCP for call routing instructions. The SCP can then query the subscriber by sending a request (via the gateway) to a computer designated by the subscriber for answering such requests. The subscriber's computer can maintain real-time, up-to-the-minute call routing instructions defined by the subscriber. For example, if the subscriber is a large corporation with many customer service representatives, the computer can provide an instruction to route the call to a customer service representative who is available to answer the call.

As would be apparent to one of ordinary skill in the art, the gateway in this second embodiment need not have the capability to park inbound calls. However, if such capability is available, the subscriber could direct the gateway to temporarily park an inbound call if, for example, all customer service representatives are busy. When a representative becomes available, either the subscriber's designated computer or the representative may send a message to the gateway providing new call routing instructions.

In a third preferred embodiment of the present invention, a telephone service provider can program, update, or otherwise manipulate service features via external databases accessible over the public computer network rather than within the closed bounds of the provider's internal network. In this embodiment, whenever the SCP receives any query (or designated queries only) from an SSP, the SCP can obtain the appropriate call routing instructions from external databases via the gateway system. Because the external databases are generally open systems for which a large body of programming and maintenance expertise exists, the third preferred embodiment allows the telephone service provider to reduce programming and maintenance costs over those incurred using SCPs, which require highly specialized programming skills to program.

In each of the above embodiments, the gateway can preferably communicate with the SCP and the computer network using transmission control protocol/internet protocol (TCP/IP). Alternatively, the other communications protocols, such as, e.g., X.25, may be used. Also in a preferred embodiment, the gateway is an AIN node having the capability to support voice channels and signaling channels, such as, e.g., a service node (SN) or other intelligent peripheral (IP) as known in the art.

Accordingly, it is an object of the present invention to integrate AIN and Internet technologies to provide telephone services.

It is another object of the present invention to enable service subscribers to manage incoming calls to a telephone line even when the telephone line is being used by the subscriber during a communication session with a computer network.

It is another object of the present invention to manage incoming calls using a subscriber's call distribution database.

It is another object of the present invention to program service features in a computer network for use by a telephone service provider.

These and other objects of the present invention are described in greater detail in the detailed description of the invention, the appended drawings, and the attached claims.

DETAILED DESCRIPTION OF THE INVENTION

The present invention integrates AIN services and service management with external networks to provide subscribers of telecommunications services additional flexibility to manage their telephone calls. The present invention enables the subscribers to receive AIN services over a computer network, and to manage their AIN profiles over the computer network. In preferred embodiments, selected AIN nodes can interface with the external networks via the public Internet, using the TCP/IP communication protocol. In alternate embodiments, the AIN nodes can communicate with the external networks via private networks.

Figure 1:
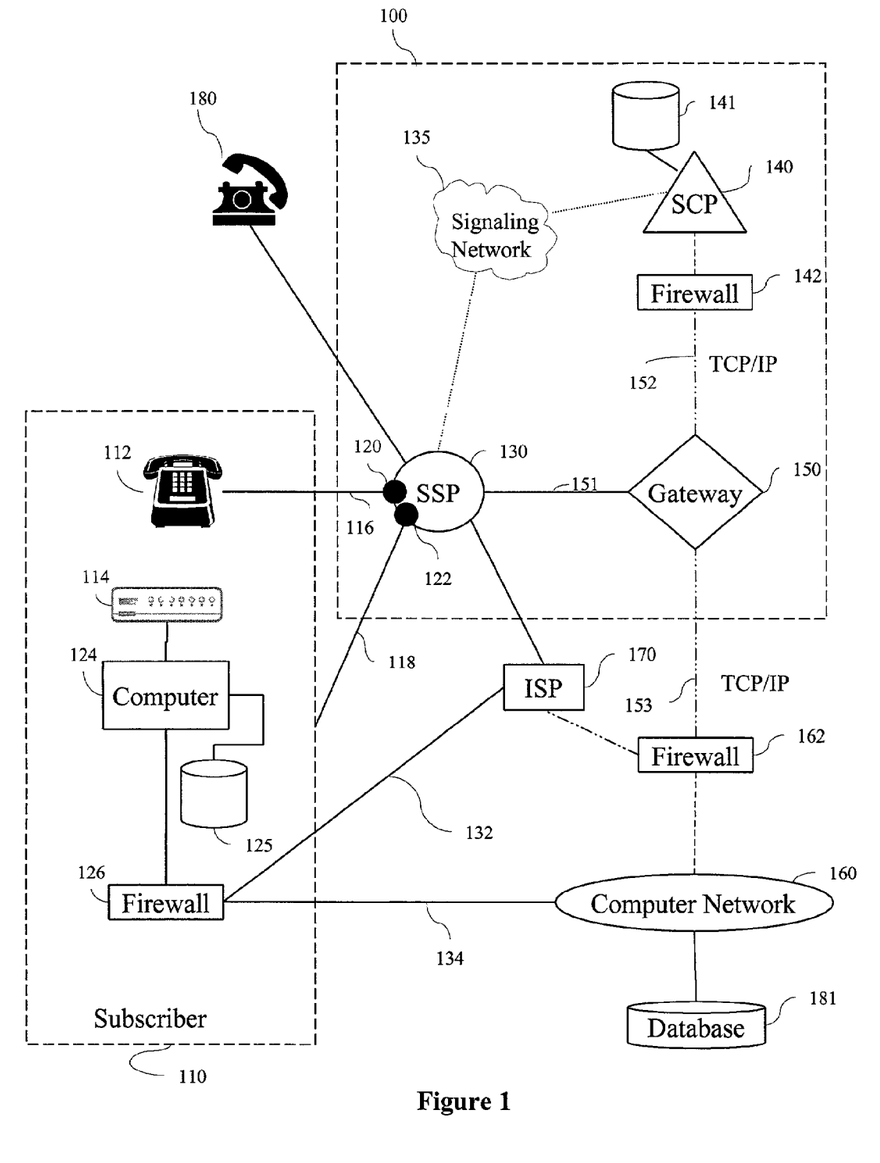
FIG. 1 is a schematic diagram showing a general system architecture according to an embodiment of the present invention.

FIG. 1 is a schematic diagram showing a general system architecture according to an embodiment of the present invention. Gateway 150 provides a gateway function between SCP 140 of AIN 100 and computer network 160. As shown in FIG. 1, in a preferred embodiment, gateway 150 can further comprise ISDN link 151 connecting it to SSP 130 and has a resource control execution environment (RCEE). As known in the art, an RCEE provides for flexible information interaction between a user and the gateway. Examples of well known AIN nodes having an RCEE include intelligent peripherals (IPe) and service nodes (SN). Unlike conventional AIN nodes, however, gateway 150 can include data links 152 and 153 to SCP 140 and computer network 160, respectively. In a preferred embodiment, data links 152 and 153 use the well-known TCP/IP communication protocol.

Firewalls 142 and 162 can be provided for security reasons to protect SCP 140 and computer network 160, respectively, from unauthorized access. As would be apparent to one skilled in the art, firewalls 142 and 162 are not required for the operation of the present invention.

Subscriber 110 is a user of the present invention. Subscriber 110 has, among other customer premises equipment (CPE), telephone 112, and modem 114. Telephone 112 and modem 114 are connected to SSP 130 by telephone lines 116 and 118, respectively. Triggers 120 and 122 can be provisioned at SSP 130 on telephone lines 116 and 118, respectively. In a preferred embodiment, triggers 120 and 122 are termination attempt triggers (TAT). Subscriber 110 also has computer 124, protected from unauthorized access by firewall 126.

As shown in FIG. 1, subscriber 110 may use modem 114 and computer 124 to connect to Internet service provider (ISP) 170 via telephone line 118. Once connected to ISP 170, subscriber 110 can access computer network 160. FIG. 1 also shows that subscriber 110 may have access to computer network 160 using either dedicated line 132 or 134. Dedicated lines 132 and 134 may be, for example, ISDN, T1, T3 or DSL lines. As shown in FIG. 1, dedicated line 132 can provide connectivity to ISP 170 while dedicated line 134 can provide connectivity directly to computer network 160. ISP 170 can provide subscriber 110 with access to computer network 160. Computer network 160 may comprise the Internet, and support a plurality of protocols, including, e.g., HTTP, NNTP, SMTP, and the like.

ISDN link 151, connecting gateway 150 and SSP 130, may be a Basic Rate Interface (BRI) line or a Primary rate Interface (PRI) line, providing both B (bearer) and D (data signaling) channels. SSP 130 can communicate with SCP 140 via signaling network 135. In a preferred embodiment, signaling network 135 can use the well-known signaling system number 7 (SS7) protocol. SCP 140 has database 141 for storing subscriber data and service logic programs for implemented AIN services.

In this architecture, the individual components have the following functions. SSP 130 can act as the switch for subscriber 110. As such, SSP 130 can receive incoming calls to subscriber 110, launch queries to SCP 140 (through signaling network 135), and route the calls to destinations specified by SCP 140. SSP 130 can be the access point through which subscriber 110 reaches ISP 170 and through which caller 180 reaches subscriber 110. As would be apparent to one skilled in the art, SSP 130 could be one or more service switching points, located together or apart.

SCP 140 is an AIN node that can receive queries from SSP 130 via signaling network 135, consult database 141 for subscriber information, and issue call routing instructions to SSP 130 based on the caller and subscriber information. Database 141 can comprise records for subscribers' telephone numbers, the category of service subscribed to, and the address (via data link 152) of gateway 150 serving the subscribers. Data may be manually provisioned on database 141. A service management system (SMS) may also be used for provisioning. In the present invention, SCP 140 can send and receive information to and from the subscriber via gateway 150 and computer network 160. As shown in FIG. 1, information may be stored in database 141 and, alternatively, information may be stored in database 181 on computer network 160 and database 125 that is accessible by computer 124. In the present invention, SCP 140 may retrieve information from databases 125, 141, and/or 181 to process calls. Preferably, SCP 140 can access information in database 125 and 181 using TCP/IP.

Figure 2:
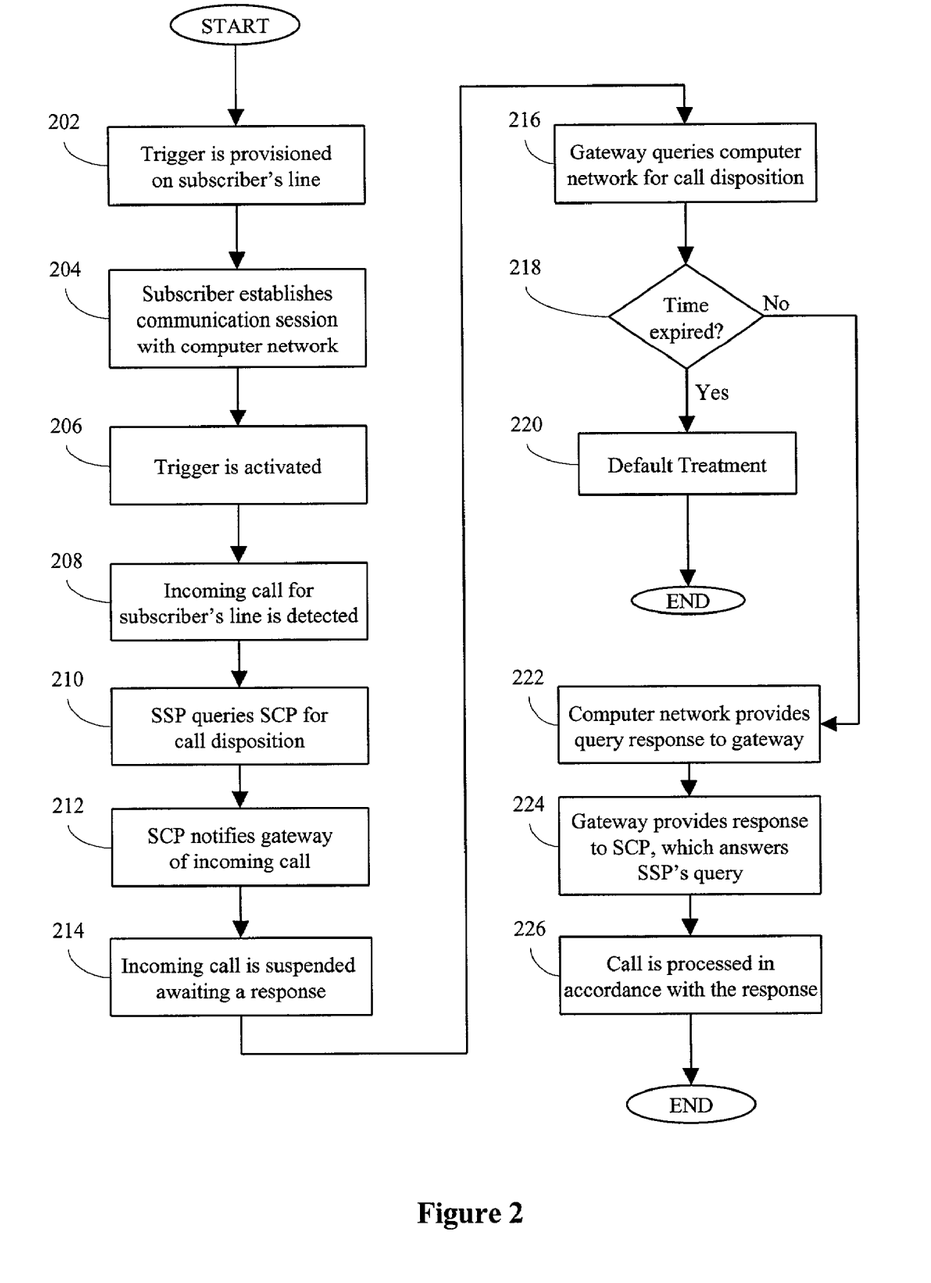
FIG. 2 is a flowchart illustrating a general steps involved in using an embodiment of the present invention.

FIG. 2 is a flowchart illustrating the general steps involved in using an embodiment of the present invention. Specific examples of using the invention are illustrated in three embodiments described below.

In step 202, a trigger is provisioned at SSP 130 for each of subscriber 110's telephone lines, i.e., triggers 120 and 122 on telephone lines 116 and 118, respectively. Triggers 120 and 122 are preferably termination attempt triggers. In step 204, subscriber 110 establishes a communications session between computer 124 and computer network 160. The communication session may be established via telephone line 118 or dedicated links 132 or 134, as described above.

In step 206, one or more of triggers 120 and 122 are activated when the communications session is established. Activation of the triggers may be accomplished in a number of different ways. For example, the trigger may be activated by SSP 130 when telephone line 118 is used to establish a dial-up connection to ISP 170. In this embodiment, a suitable originating call trigger can be used. Suitable triggers include, e.g., a customized dial plan code trigger, a public office dialing plan trigger, and the like. On the other hand, if dedicated links 132 or 134 are used to establish the communications session, computer 124 or some other node on computer network 160 may send a message to SCP 140 (via gateway 150). Upon receipt of the message, SCP 140 can activate one or more of triggers 120 and 122.

In step 208, an incoming call intended for subscriber 110 is detected at SSP 130 by one of triggers 120 and 122. For example, if caller 180 dials the telephone number assigned to telephone line 116, the call is detected by trigger 120. Similarly, a call for telephone line 118 is detected by trigger 122. In step 210, as a result of the trigger detection in step 208, a query is sent from SSP 130 to SCP 140 for call disposition or call routing instructions. Preferably, the query is a transaction capabilities application part (TCAP) query comprising subscriber and caller information such as, e.g., the subscriber's telephone number, the caller's telephone number and the time at which the call was detected.

In step 212, SCP 140 sends a message to gateway 150 notifying it that an incoming call has been received for subscriber 110. In a preferred embodiment, the notice comprises the subscriber and caller information, and preferably, additional information, such as the caller name, address, or other information commonly stored in databases maintained by the telephone service provider. The additional information may be obtained from database 141. In step 214, the incoming call can be suspended while SCP 140 awaits a response from gateway 150. In a preferred embodiment, a pre-recorded announcement can be played for the caller. The announcement may be, for example, "Please wait while your call is being processed."

In step 216, gateway 150 sends a message to computer network 160 via data link 153. The message comprises the subscriber and caller information and a request for call processing instructions. In step 218, SCP 140 can determine whether or not a predetermined amount of time has expired. If a response is timely received from computer network 160, it is passed on to SCP 140 by gateway 150. If the time has expired before a response is received by SCP 140, it can instruct SSP 130 to use a default treatment to the incoming call. The default treatment may be any one of call dispositions selected by the subscriber. The default treatment alternatively may be a call disposition selected by the telephone service provider. The default treatment may be, for example, routing the incoming call to the subscriber's voice mailbox or a busy signal, or playing an announcement to the caller.

On the other hand, if the time has not expired before SCP 140 receives a response from gateway 150, the process moves on to step 222. In step 222, computer network 160 provides call processing instructions to gateway 150. Then, in step 224, gateway 150 forwards the response to SCP 140. In turn, SCP 140 instructs SSP 130 to process the incoming call according to the instructions from computer network 160. The response may be retrieved from database 125 and/or database 181, or the subscriber directly. In step 226, SSP 130 processes the call in accordance with the response. As would be apparent to one of skill in the art, gateway 150 could also be programmed to set a time to determine whether or not a timely response has been received.

Various embodiments of the present intention may be implemented. Three specific preferred embodiments are described below. In the first preferred embodiment, a subscriber or user of the present invention may take advantage of one or more AIN services on a telephone line, even while that telephone line in being used by the subscriber to access the computer network. For example, when an incoming call to the telephone line is detected during a communication session between the subscriber and the computer network, the subscriber is made aware of the call and is given a plurality of options to dispose of the call. In the second preferred embodiment, an incoming call is automatically disposed of using subscriber-defined rules that are stored in a database managed by the subscriber. For example, when an incoming call intended for the subscriber is received, the SCP, instead of consulting an AIN database, can retrieve call routing instructions from the subscriber's computer via the computer network. In the third preferred embodiment, a telephone service provider programs and maintains telephone service features on the computer network, and the SCP requests information from the computer network instead of its local database. In each embodiment of the present invention, the computer network preferably uses TCP/IP protocol for communications. The computer network is preferably a global computer network. The global computer network is preferably the Internet.

Figure 3:
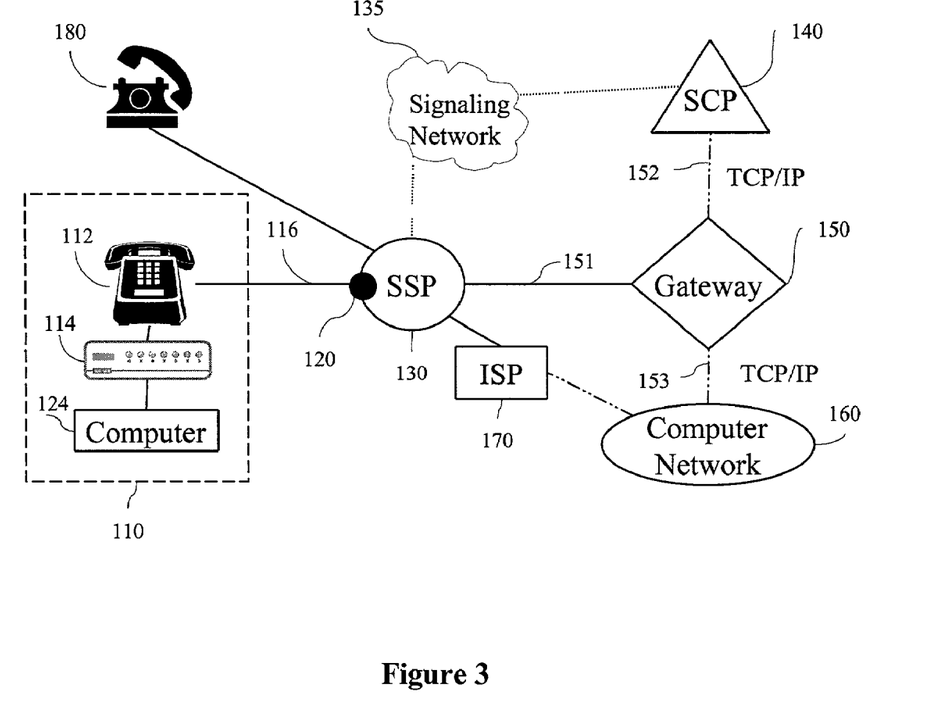
FIG. 3 is a schematic diagram showing the system architecture according to a first preferred embodiment of the present invention.

FIG. 3 is a schematic diagram showing the system architecture according to the first preferred embodiment of the present invention, illustrating the implementation of a specific example in which subscriber 110 is an individual who does not want to miss any incoming calls to telephone line 116 while telephone line 116 is in use during a communication session with computer network 160. In this example, subscriber 110 uses modem 114 and computer 124 to access computer network 160 via telephone line 116 and ISP 170. When caller 180 dials the telephone number of telephone line 116, subscriber 110 receives, from SCP 140 (via gateway 150) a message or a call processing request comprising the calling party's number and name (if known) as well as the time of the call. A client application running on computer 124 receives the message and logs or displays the information within a dialog box provided to subscriber 110. In a first aspect of this first preferred embodiment, nothing further occurs. That is, SCP 140 can instruct SSP 130 to treat the call as any other would be handled, without this new service. Possible call treatments include, e.g., providing a busy signal, forwarding the call to voicemail, and the like. In this aspect of the present invention, gateway 150 need not include an ISDN link to SSP 130 because no voice circuits or signaling circuits are needed between the two nodes.

In a second aspect of the first preferred embodiment, in addition to all features described in the first aspect of the first preferred embodiment, the present invention further comprises additional features allowing subscriber 110 to dispose of the incoming call in one of several ways. For example, when caller 180 dials the telephone number of telephone line 116 while subscriber 110 is accessing computer network 160 through ISP 170, a window can pop up on the screen of computer 124 containing the calling party's name and number with a plurality of soft button options for call disposition. These buttons may include, for example, "Ignore," "Forward," and "Answer." In this embodiment, gateway 150 includes ISDN link 151 to SSP 130, thereby allowing gateway 150 to receive and process the incoming call while subscriber 110 decides upon subsequent call processing instructions.

Figure 4:
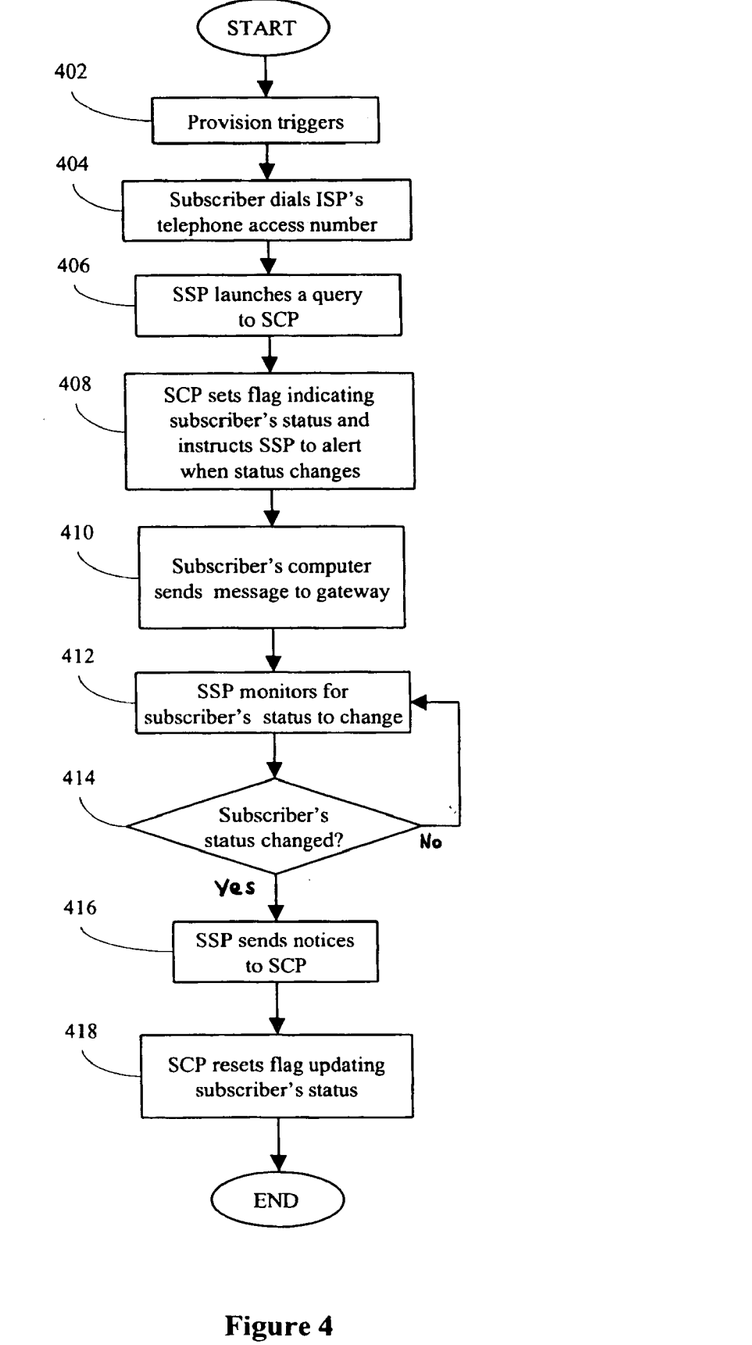
FIGS. 4 and 5 are flowcharts illustrating the steps involved in using the first preferred embodiment of the present invention.
Figure 5:
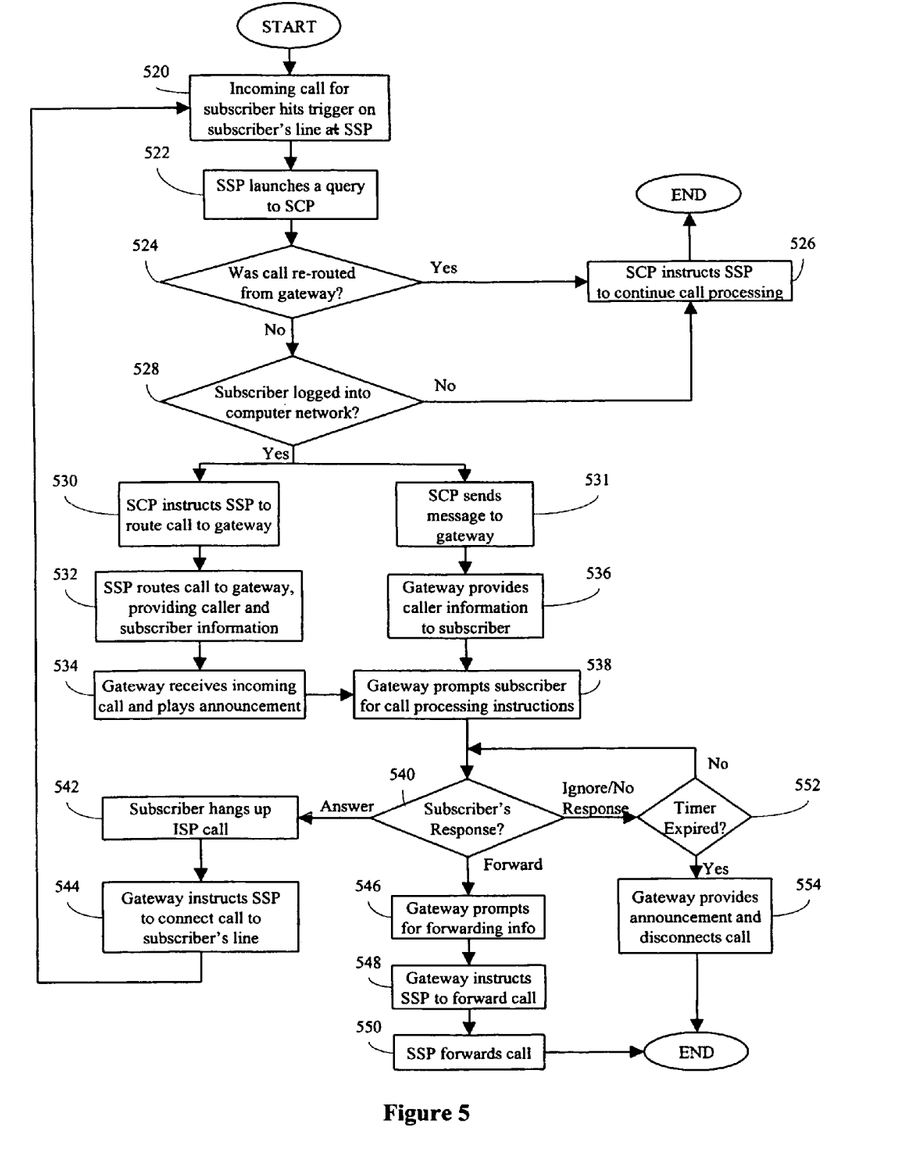

The flowcharts in FIGS. 4 and 5 illustrate the steps involved in implementing and using the first preferred embodiment of the present invention. FIG. 4 deals with preliminary setup of the invention, and the steps involved when subscriber 110 initiates and ends a call to ISP 170. FIG. 5 deals with the steps involved in processing incoming calls for telephone line 116.

In step 402, appropriate triggers are provisioned on SSP 130. A first trigger (not shown in FIG. 3) can detect when subscriber 110 uses telephone line 116 to establish a dial-up connection with ISP 170. Suitable triggers for this include, e.g., a customized dialing plan (CDP) trigger on telephone line 116, or a public office dialing plan (PODP) trigger on ISP 170's telephone access numbers. A second trigger, trigger 120 shown in FIG. 3, can detect when an incoming call to telephone line 116 is received at SSP 130. In a preferred embodiment, trigger 120 is a termination attempt trigger (TAT).

In step 404, when the subscriber dials the telephone number of ISP 170, the first trigger on SSP 130 is encountered. In response to this first trigger, SSP 130 sends a query to SCP 140 (via signaling network 135) in step 406. The query provides the caller's information, such as the caller's telephone number, and subscriber 110's information such as subscriber 110's telephone number. In step 408, SCP 140 acts on the query by setting a flag in its database to indicating that subscriber 110 is currently logged in to computer network 160 (via ISP 170). SCP 140 responds to SSP 130's query by instructing it to continue call processing and to monitor subscriber 110's telephone line for a change in status. In this manner, SCP 140 is able to keep its database up-to-date with the current status of subscriber 110's line.

In step 410, once subscriber 110 has logged into computer network 160, a message is sent over the network (i.e., data link 153) to gateway 150 providing subscriber 110's telephone number, and network address. The message may be sent manually by subscriber 110, or preferably, a client program running on computer 124 automatically sends the message upon successful connection to computer network 160.

In steps 412 and 414, SSP 130 continually monitors subscriber 110's telephone line 116 for a change in status. When a change in status occurs, such as, e.g., when subscriber 110 disconnects from computer network 160, SSP 130 sends a notice message to SCP 140 (in step 416). Upon receipt of the notice, SCP 140 re-sets the flag to update subscriber 110's new status. As noted above, the steps 412 through 418 are provided to keep SCP 140 informed of the present status of subscriber 110's telephone line 116. In alternative embodiments, SCP 140 could receive such updates through other means, e.g., via gateway 150.

As noted above, FIG. 5 provides the steps for processing incoming calls to subscriber 110's telephone line 116 under the first preferred embodiment of the present invention. When SSP 130 receives a call for subscriber 110, trigger 120 is encountered (step 520). In step 522, SSP 130 suspends the call and launches a query to SCP 140. As explained in greater detail below, if the call had been re-routed to subscriber 110 by the system and method of the present invention, trigger 120 will be encountered a second time. Accordingly, in step 524, SCP 140 checks the information provided in the query to determine whether or not this particular call has already been processed by gateway 150. If so, SCP 140 directs SSP 130 to continue normal call processing in step 526. This ends the process and SSP 130 attempts to connect the call to telephone line 116 as if it would any other call in the absence of the present invention. In a preferred embodiment, SCP 140 checks the redirecting party number field in the query message to determine if gateway 150 redirected the call to telephone line 116.

If the call was not already processed by gateway 150, SCP 140 checks its database (not shown in FIG. 3) to determine the status of subscriber 110's telephone line 116 in step 528. If subscriber 110 is not logged into to computer network 160, SCP 140 responds to SSP 130's query by instructing it to continue normal call processing in step 526, as described above. If subscriber 110 is online, the process branches into two processes, at steps 530 and 531, as shown in FIG. 5. The first branch, starting with step 530, deals with SCP 140's immediate response to SSP 130's query. The other branch, starting with step 531, deals with SCP 140's interaction with gateway 150 and subsequent call processing according to subscriber 110's instructions.

In step 530, SCP 140 responds to the query by instructing SSP 130 to route the call to gateway 150. In step 532, SSP 130 complies with SCP 140's instructions and connects the call to gateway 150 via ISDN link 151. As previously noted, in one aspect of this embodiment, the caller is simply provided a busy signal or is automatically routed to an alternate number or voicemail. In this case, the first branch would end with SCP 140 sending a continue or other routing instruction to SSP 130 (as in step 526). However, in the second aspect, the present embodiment of this invention moves on to step 534, where the call is connected to gateway 150. When the call is presented to gateway 150, caller 180's number and the originally dialed number are included in the call setup message. This information allows gateway 150 to uniquely identify the call as a call bound for subscriber 110. Upon receiving the call, gateway 150 plays an announcement to the caller in step 534. The announcement could say, e.g., "Please wait while your call is being processed."

In step 531 (the other branch of the process), SCP 140 sends a message to gateway 150 providing information about the call. The information includes the calling party number, as well as the time of the call and provides subscriber 110's telephone number (i.e., the called party number). In a preferred embodiment, the message also comprises the calling party's name, which may be obtained from a database maintained on SCP 140 or another SCP node in the AIN. In step 536, gateway 150 provides this information to subscriber 110. In a preferred embodiment, a client application running on subscriber 110's computer 124 receives the message from gateway 150 and logs or conveniently displays the information to subscriber 110.

As discussed above, in one aspect of the present invention, no further action would be taken if subscriber 110 has a subscription to a notification-only service. The subscriber can view the logged information at any time within a-dialog box on the computer 124's video display. The dialog box contains the name and number of caller 180. If subscriber 110's service subscription also provides the capability to direct call disposition, gateway 150 prompts subscriber 110 for instructions in step 538. In an alternative embodiment, gateway 150 may query subscriber 110's computer 124 to obtain call processing instructions. In a preferred embodiment, a client application running on subscriber 110's computer 124 provides a graphical user interface (GUI) for selecting and sending subscriber 110's call processing instructions.

Although FIG. 5 shows only three of the possible call disposition choices a subscriber may make, other disposition instructions could be provided. Other call disposition instructions could include, e.g., to hold the call until subscriber 110 is free to answer, play a pre-made announcement to caller 180, prompt caller 180 for more information, play an announcement generated using a text-to-voice system, and the like. In step 540, gateway 150 determines subscriber 110's response. If subscriber 110 chooses to answer the call, the process moves on to step 542. In step 542, subscriber 110 hangs up the call to ISP 170. In a preferred embodiment, a client application running on subscriber 110's computer 124 automatically hangs up the ISP call just after sending gateway 150 subscriber 110's instructions. In step 544, gateway 150 instructs SSP 130 to connect the call to subscriber 110 on telephone line 116. The instructions are provided to via the data channel of ISDN link 151. As discussed above, upon rerouting the call to subscriber 110's telephone line 116, trigger 120 will encountered, just as the original incoming call encountered the trigger (step 520). In step 522, SSP 130 sends a new query to SCP 140 in response to trigger 120. This time, in step 524, SCP 140 detects that the call has been processed by gateway 150. Accordingly, SCP 140 instructs SSP 130 to continue with normal call processing in step 526. At this point, subscriber 110's telephone line 116 will ring (unless the telephone line is still in use) and subscriber 110 can answer the call.

If subscriber 110 chooses to forward the call in step 540, then subscriber 110 is asked to supply a forwarding telephone number in step 546. In step 548, gateway 150 instructs SSP 130 (via ISDN link 151) to forward the call to the telephone number per subscriber 110's instructions. In step 550, SSP 130 forwards the call and the process is finished.

If subscriber 110 chooses to ignore the call or does not provide a response back to gateway 150 within a pre-determined amount of time, gateway 150 plays an announcement to the caller and disconnects the call, as described in steps 552 and 554. In an alternative embodiment, gateway 150 may provide a default instruction to SSP 130 if no response is received from subscriber 110. The default instruction may, for example, comprise an instruction to forward the call from caller 180 to subscriber 110's voice mailbox.

Figure 6:
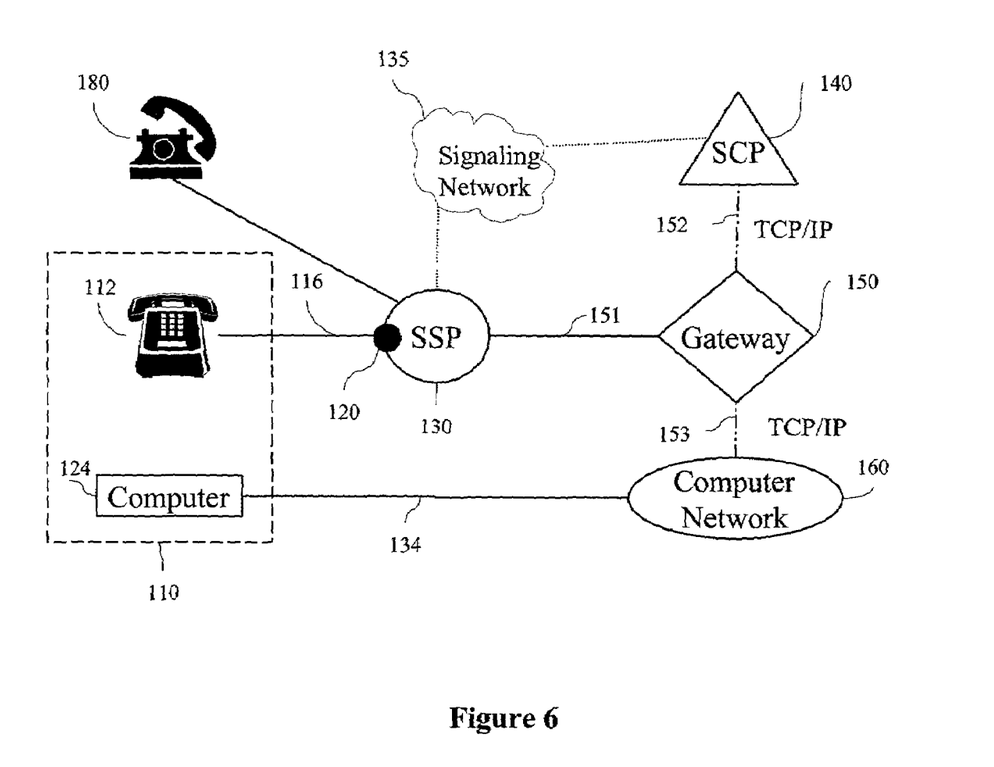
FIG. 6 is a schematic diagram showing the system architecture according to a second preferred embodiment of the present invention.

FIG. 6 is a schematic diagram showing the system architecture according to the second preferred embodiment of the present invention, illustrating the implementation of a specific example in which subscriber 110 is, e.g., a corporation with a high volume of incoming calls to a specific telephone number. The specific telephone number may be a 800-toll free number. In the example, telephone line 116, telephone 112, and trigger 120 may represent one or more such lines, phones or triggers. A single line, phone and trigger are shown in FIG. 6 for clarity. Similarly, computer 124 can be a local area network of subscriber 110, and computer 124 is in communication with computer network 160 via dedicated link 134. Dedicated link 134 may be, for example, an ISDN, a DSL, a T1, or a T3 line. Computer network 160 can be, for example, an Intranet of subscriber 110 or the Internet or any other computer network.

Subscriber 110 uses client application, e.g., a GUI-based tool (or an API), to define its customer profile. The profile specifies the treatment of incoming calls to one or more customer-specified telephone numbers. The profile may define different criteria for deciding call treatment, e.g., based on the status of the called number (busy or idle), calling party number, time of day, day of week, congestion status of the called station (for call centers) and other such parameters. The call treatment itself can consist of, e.g., normal or distinctive ringing, playing customized announcements, forwarding to another number or to voice mail, and call termination.

Figure 7:
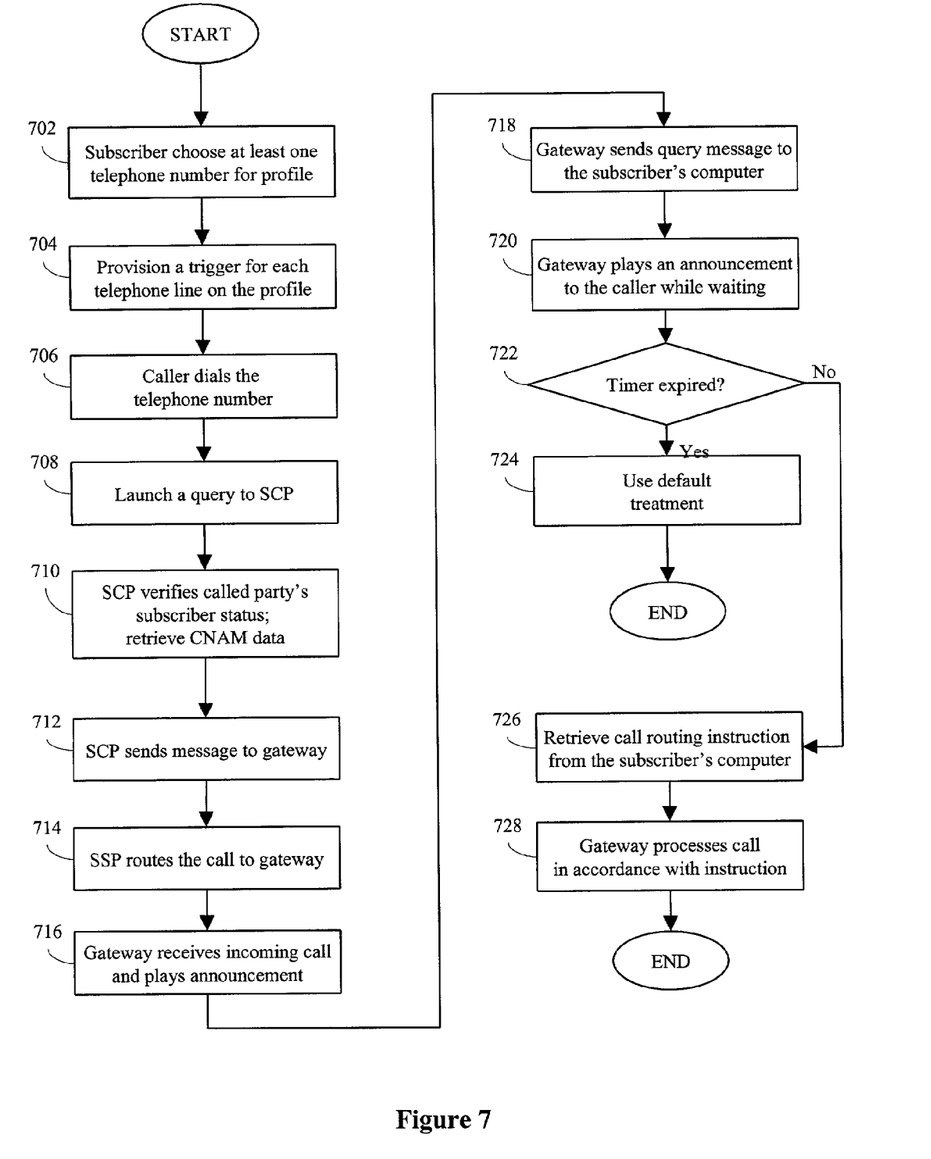
FIG. 7 is a flowchart illustrating the steps involved in using the second preferred embodiment of the present invention.

FIG. 7 is a flowchart illustrating the steps involved in using the second preferred embodiment of the present invention. In step 702, subscriber 110 designates one or more telephone numbers that will be processed according to instructions in its customer profile. For example, these affected numbers may include the telephone number for telephone line 116 shown FIG. 6. In step 704, for each affected number, trigger 120 is provisioned on SSP 130 that services those telephone numbers.

In step 706, caller 180 dials the telephone number for telephone line 116. In step 708, when SSP 130 receives the call, trigger 120 causes SSP 130 to send a query to SCP 140. In step 710, SCP 140 checks the subscription database. It also retrieves the calling party name, if available, from a calling party name database. In step 712, SCP 140 sends this information to gateway 150 via data link 152. In step 714, SCP 140 instructs SSP 130 to route the incoming call to gateway 150. In step 716, gateway 150 receives the call and plays an announcement to caller 180.

In step 718, upon receipt of a message or a call processing request from SCP 140 via data link 152, gateway 150 sends a message to the subscriber's computer 124 over computer network 160. This message includes the calling party name and telephone number and the called party telephone number. In step 720, gateway 150 may also play a customized announcement to caller 180 based on information received from SCP 140.

In step 722, a determination is made as to whether a time has expired. If a predefined time limit has expired before the response is received by SCP 140 and SSP 130, the process goes to step 724, in which a default treatment is given for gateway 150, SSP 130 or SCP 140 to process the call. Otherwise, the process moves on to step 726.

In step 726, gateway 150 retrieves call routing instructions from computer 124 via data link 151 and computer network 160. A client application on subscriber 110's computer 124 checks the customer profile and provides instructions on how the incoming call is to be treated. Computer 124 may, for example, determine which customer service representative is available to answer the call. In step 728, gateway 150 processes call in accordance with the instructions.

Other kinds of applications can be implemented using the present invention. In general, if information can be created and stored on a subscriber's computer, such information can be accessed and retrieved by a gateway system for use to determine service or call-routing disposition. The examples given above define two types of services that can be implemented. Other types of services can be implemented, for example, a gateway having a text-to-speech translation capability can be used to retrieve text messages from the subscriber and provide audible messages to callers. E-mail delivery using AIN is an example of such a service. Other services in this category include informational services (market quotes, weather, theater listings, and the like).

Figure 8:
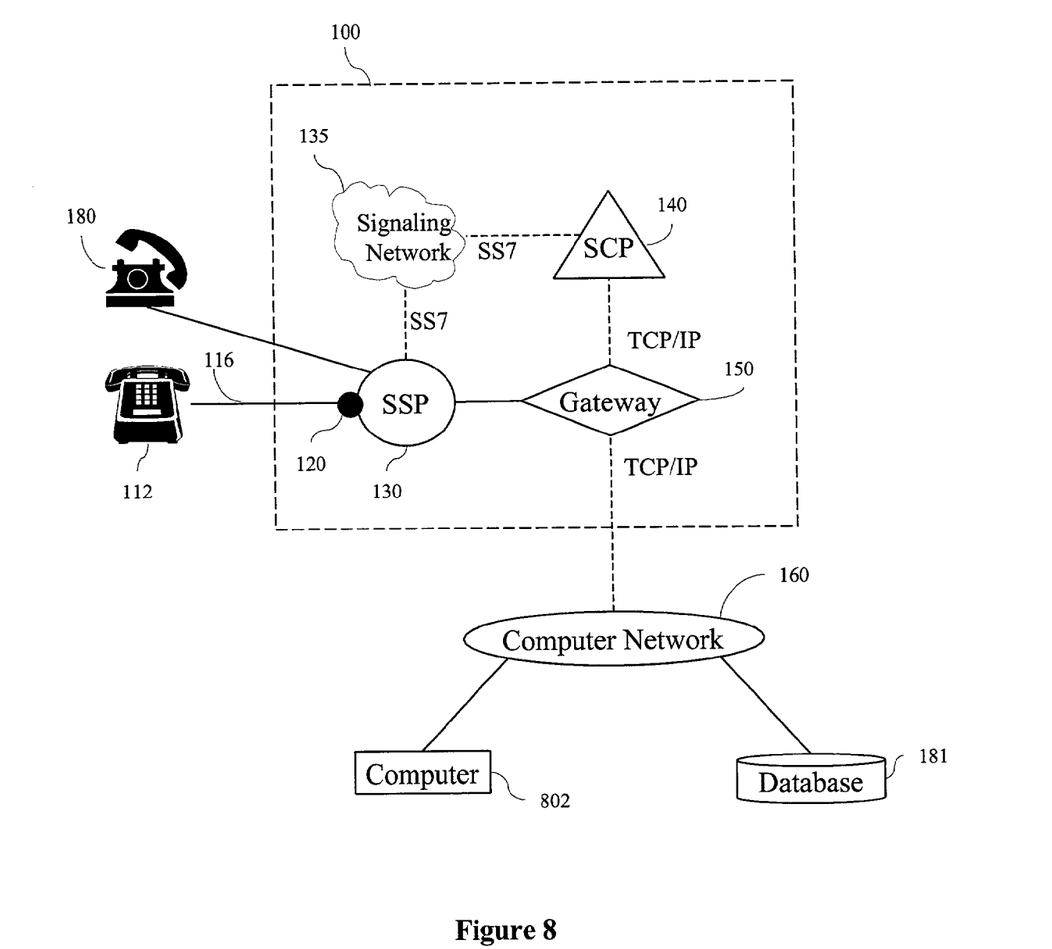
FIG. 8 is a schematic diagram showing the system architecture according to a third preferred embodiment of the present invention.
Figure 9:
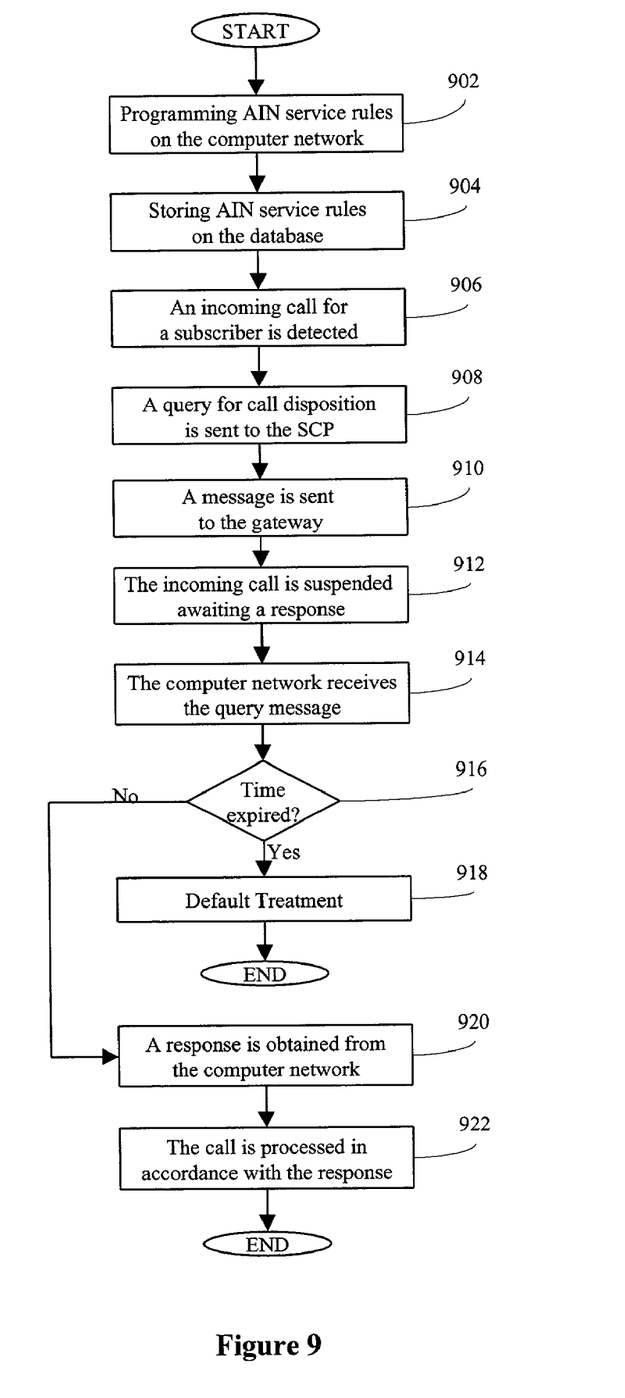
FIG. 9 is a flowchart illustrating the steps involved in using the third preferred embodiment of the present invention.

A third preferred embodiment of the present invention is illustrated in FIG. 8. In this embodiment, computer 802 and database 181 are managed by a telephone service provider via computer network 160 which is external to AIN 100. FIG. 9 is a flowchart illustrating the steps involved in using the third preferred embodiment of the present invention.

In step 902, AIN service related information is defined and created using computer 802. In step 904, the information is stored in database 181. Preferably, database 181 contains all the information that is typically found in an SCP database, such as database 141 shown in FIG. 1.

In step 906, a call is detected by an SSP. For example, when caller 180 has finished dialing the telephone number of telephone line 116, the call is detected at SSP 130 by trigger 120. In step 908, a query for call disposition is sent to SCP 140. In step 910, SCP 140 sends a message to gateway 150. The message is preferably sent using TCP/IP. Gateway 150 sends the call disposition query to computer network for processing. The message can comprise a call processing request.

In step 912, the incoming call is suspended while gateway 150 waits for a response from computer network 160. In step 914, computer network 160 receives the query and beings to process it. Preferably, a timer is provisioned in one or more of SCP 140, gateway 150, and computer network 160. If in step 916 the time expired before a response is received from computer network 160, a default treatment is given for SSP 130 to process the call in step 918.

Otherwise, in step 920, a response to the query is obtained from computer network 160. Preferably, computer network 160 accesses database 181 to retrieve call routing instructions in response to the query. In step 922, the call is processed in accordance with the response.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A system for processing voiced communications through a computer network, the system comprising:
    (a) a switch associated with a telephone line, wherein the switch comprises a trigger that is provisioned for the telephone line;
    (b) a controller in communication with the switch via a first protocol; and
    (c) a gateway in communication with the switch and the controller through communication links distinct from the computer network,
    wherein the controller communicates over one of the communication links to the gateway such that the controller sends information in a second protocol that is different than the first protocol and the gateway receives the information from the controller in the second protocol and the gateway sends information in the second protocol to the controller and the controller receives the information in the second protocol, wherein the gateway is connected to the computer network, wherein the switch launches a query to the controller when an incoming communication from a calling party intended for the telephone line is detected by the trigger;

wherein the controller sends a call processing request to the gateway through one of the communication links when the controller receives the query;

wherein the controller sends an instruction to the switch to park the incoming communication at the gateway;

wherein the switch parks the communication at the gateway through one of the communication links in response to the instruction;

wherein the gateway communicates with the computer network to obtain a response to the query from the controller to process the communication; and wherein the switch processes the incoming communication in accordance with the response.

2. The system of claim 1, wherein the controller, the gateway, and the computer network communicate using a TCP/IP interface.

3. The system of claim 1, wherein trigger is a termination attempt trigger.

4. The system of claim 1, wherein the call processing request comprises one or more of an identity of the calling party, a telephone number of the calling party, and a plurality of call routing options.

5. The system of claim 1, wherein the response is obtained from a database accessible via the computer network.

6. The system of claim 1, wherein the telephone line is being used by a called party to maintain a communication session with the computer network.

7. The system of claim 6, wherein the response is obtained from the called party during the communication session.

8. The system of claim 6, wherein the response is obtained from a computer of the called party during the communication session.

9. The system of claim 1, wherein the telephone line belongs to a called party who maintains a communication session with the computer network using a dedicated communication link.

10. The system of claim 9, wherein the response is obtained from a database of the called party during the communication session.

11. A method for processing telephone communications intended for a telephone line of a called party using a computer network, the method comprising the steps of:

provisioning a trigger on the telephone line at a switch;

detecting an incoming communication for the telephone line at the switch;

launching a query to a controller when the incoming communication is detected;

sending a call processing request to a gateway through a communication link distinct form the computer network when the query is received;

sending an instruction to the switch to park the incoming communication at the gateway;

parking the incoming communication at the gateway in response to the instruction;

providing the call processing request from the gateway to the computer network;

obtaining a response at the gateway for processing the communication from the computer network; and processing the incoming communication at the switch in accordance with the response received by the gateway.

12. The method of claim 11, further comprising the step of contacting the called party via the computer network.

13. The method of claim 11, wherein the call processing request comprises one or more of an identity of the calling party, a telephone number of the calling party, and a plurality of call routing options.

14. The method of claim 13, further comprising the step of selecting one of the plurality of call routing options, wherein the response comprises the selected call routing option.

15. The method of claim 11, further comprising the step of accessing a database via the computer network.

16. The method of claim 15, further comprising the step of obtaining the response from the database.

17. The method of claim 11, further comprising the step of accessing a computer of the called party via the computer network.

18. The method of claim 17, further comprising the step of obtaining the response from the computer.

19. The method of claim 11, further comprising the step of processing the incoming communication in accordance with a default treatment if the response failed to be obtained.

20. The method of claim 19, wherein the default treatment is to terminate the incoming communication to the called party's voice mailbox.

21. A system for managing a telephone call from a caller that is intended for a telephone line of a subscriber who is associated with a computer network and a computer, the system comprising:

(a) a service switching point in a public switched telephone network, wherein the service switching point comprises a trigger that is connected to the telephone line;

(b) a service control point in communication with the service switching point; and (c) a gateway in communication with the service switching point and the service control point through communication links distinct from the computer network, wherein the gateway is connected to the computer network, wherein the trigger is activated when a communication session is established between the computer and the computer network;

wherein the service switching point launches a query to the service control point when an incoming call intended for the subscriber is detected by the trigger;

wherein the service control point sends a call processing request to the gateway through one of the communication links when the service control point receives the query;

wherein the service control point sends an instruction to the service switching point to park the incoming call at the gateway;

wherein the service switching point parks the call at the gateway through one of the communication links in response to the instruction;

wherein the gateway communicates with the computer via the computer network to obtain a response to the query from the service control point; and wherein the service control point terminates the incoming call in accordance with the response.

22. The system of claim 21, wherein the subscriber uses the telephone line to establish the communication session between the computer and the computer network.

23. The system of claim 21, wherein the subscriber uses a communication link to establish the communication session between the computer and the computer network.

24. The system of claim 23, wherein the communication link is a second telephone line.

25. The system of claim 23, wherein the communication link is one of an ISDN line, a DSL, a Ti line, and a T3 line.

26. The system of claim 21, wherein the response comprises an instruction to (a) end the communication session between the computer and the computer network, and (b) terminate the incoming call to the telephone line.

27. The system of claim 21, wherein the trigger is a termination attempt trigger.

28. A system for managing a telephone call from a caller that is intended for a telephone line of a subscriber who is associated with a computer network, the system comprising:
(a) a service switching point in a public switched telephone network, wherein the service switching point comprises a trigger that is provisioned for the telephone line;
(b) a service control point in communication with the service switching point;
(c) a gateway in communication with the service switching point and the service control point through communication links distinct from the computer network, wherein the gateway is connected to the computer network; and
(d) a database associated with the computer network, wherein the database contains call routing instructions,
wherein the service switching point launches a query to the service control point when an incoming call intended for the subscriber is detected by the trigger;
wherein the service control point sends a call processing request to the gateway through one of the communication links when the service control point receives the query;
wherein the service control point sends an instruction to the service switching point to park the incoming call at the gateway;
wherein the service switching point parks the call at the gateway through one of the communication links in response to the instruction;
wherein the gateway communicates with the database via the computer network to obtain a response to the query from the database;
wherein the response comprises information from the database; and
wherein the service control point terminates the incoming call in accordance with the response.

29. The system of claim 28, wherein the call routing instructions are maintained by the subscriber.

30. The system of claim 28, wherein the subscriber uses a computer to establish the communication session with the computer network.

31. The system of claim 28, wherein the database is associated with the computer.

32. The system of claim 28, wherein the database is accessible to the subscriber via the computer.

33. The system of claim 28, wherein the trigger is activated when a communication session is established between the subscriber and the computer network.

34. A method for managing an incoming communication intended for a telephone line of a subscriber who is associated with a computer network and a computer, the method comprising the steps of:
establishing a communication session between the computer and the computer network using a communication link;
provisioning a trigger on the telephone line at a switch;
detecting the incoming communication at the switch;
launching a query to a controller;
sending a call processing request to a gateway over a communication link distinct from the computer network;
sending an instruction to the switch to park the communication at the gateway;
parking the communication at the gateway in response to the instruction;
providing the call processing request to the subscriber from the gateway via the computer network during the communication session;
formulating a response to the call processing request that is received by the gateway; and
completing the incoming communication in accordance with the response.

35. The method of claim 34, wherein the communication link is the telephone line.

36. The method of claim 34, wherein the communication link is a second telephone line.

37. The method of claim 34, wherein the communication link is one of an ISDN line, a DSL, a Ti line, and a T3 line.

38. The method of claim 34, wherein the trigger is a termination attempt trigger.

39. The method of claim 34, further comprising the step of activating the trigger when a communication session is established between the computer and the computer network.

40. The method of claim 34, wherein the computer network is associated with a database, wherein the database comprising call routing instructions.

41. The method of claim 40, wherein the call routing instructions are maintained by the subscriber.

42. The method of claim 40, wherein the database is associated with the computer.

43. The method of claim 42, wherein the database is accessible to the subscriber via the computer.

* * * * *